United States Patent
Hill

[11] 3,710,227
[45] Jan. 9, 1973

[54] BATTERY CHARGING SYSTEMS FOR ROAD VEHICLES

[75] Inventor: William Frank Hill, Stafford, England

[73] Assignee: Joseph Lucas (Industries) Limited, Birmingham, England

[22] Filed: May 18, 1971

[21] Appl. No.: 144,578

[30] Foreign Application Priority Data

June 13, 1970 Great Britain..................28,745/70

[52] U.S. Cl. .....................320/59, 317/33, 322/28
[51] Int. Cl..............................H02p 7/06, H02p 9/30
[58] Field of Search.............320/39, 40, 59, 60, 61; 322/28, 99; 317/33 R, 33 SC, 32

[56] References Cited

UNITED STATES PATENTS

| | | |
|---|---|---|
| 3,383,563 | 5/1968 | Wright...............................317/33 SC |
| 3,530,366 | 9/1970 | Schwarm..............................322/28 |
| 3,571,657 | 3/1971 | Domann..............................317/33 R |

*Primary Examiner*—J. D. Miller
*Assistant Examiner*—Robert J. Hickey
*Attorney*—Holman & Stern

[57] ABSTRACT

A battery charging system for a road vehicle has a three phase permanent magnet alternator for charging the battery through a full wave rectifier. Thyristors are associated with the full wave rectifier for controlling the supply of power from the alternator to the battery, conduction of the thyristors being determined by a voltage regulator coupled to the battery. The rectifier consists of four thyristors and two diodes, the two diodes being associated with one phase of the alternator and the four thyristors being associated with the other two phases of the alternator. If a voltage surge occurs as a result of the battery being disconnected, then means operate to ensure that gate current is removed from the thyristors to ensure that the thyristors turn off.

3 Claims, 2 Drawing Figures

BATTERY CHARGING SYSTEMS FOR ROAD VEHICLES

This invention relates to battery charging systems for road vehicles, of the kind including a three phase permanent magnet alternator for charging the battery through a full wave rectifier, thyristors associated with the full wave rectifier for controlling the supply of power from the alternator to the battery, and a voltage sensitive control circuit controlling the gate current supplied to the thyristors to regulate the output voltage of the alternator.

The object of the invention is to provide such a system in a form in which the risk of damage to components in the system if the battery becomes disconnected is minimized.

According to the invention, in a battery charging system of the kind specified the full wave rectifier includes four thyristors and two diodes, the two diodes being associated with one phase of the alternator and the four thyristors being associated with the other two phases of the alternator, the voltage-sensitive control circuit providing gate current to the four thyristors when the rectifier output voltage is below a predetermined value, and removing the gating current when the rectifier output voltage is above the predetermined value, the system further including means for sensing a voltage surge caused by disconnection of the battery, and for ensuring that in these circumstances gate current is removed from the thyristors for sufficiently long to ensure that the thyristors turn off.

In one known arrangement, the full wave rectifier consists of three thyristors and three diodes, one thyristor and one diode being associated with each phase. In such an arrangement if the battery becomes disconnected, whilst it is receiving a charging current there will be a surge between the output lines caused by the inductive energy of the alternator, and this surge will result in the gate current being removed from the thyristors. Each thyristor will then turn off as soon as it is reverse biased, so that no further supply is fed from the alternator to the output lines. However, it will be appreciated that whether or not a thyristor turns off depends on whether its current falls to zero. With such an arrangement each thyristor can conduct by way of one of the diodes associated with the two phases other than the phase with which the thyristor is associated. In some circumstances, the current flow will not fall to zero and so the thyristor will not turn off, and damage to components in the system can result. A simple solution to this problem is to provide in the full wave rectifier six thyristors, but thyristors are expensive, so that this solution is not attractive. The present invention overcomes this problem by using four thyristors, together with two diodes. Such a system works satisfactorily, and saves the additional cost of two thyristors provided that the supply of gate current to the thyristors is not resumed before they have all turned off. For this reason, the additional means sensitive to disconnection of the battery is provided.

In the accompanying drawing.

Figure 1:
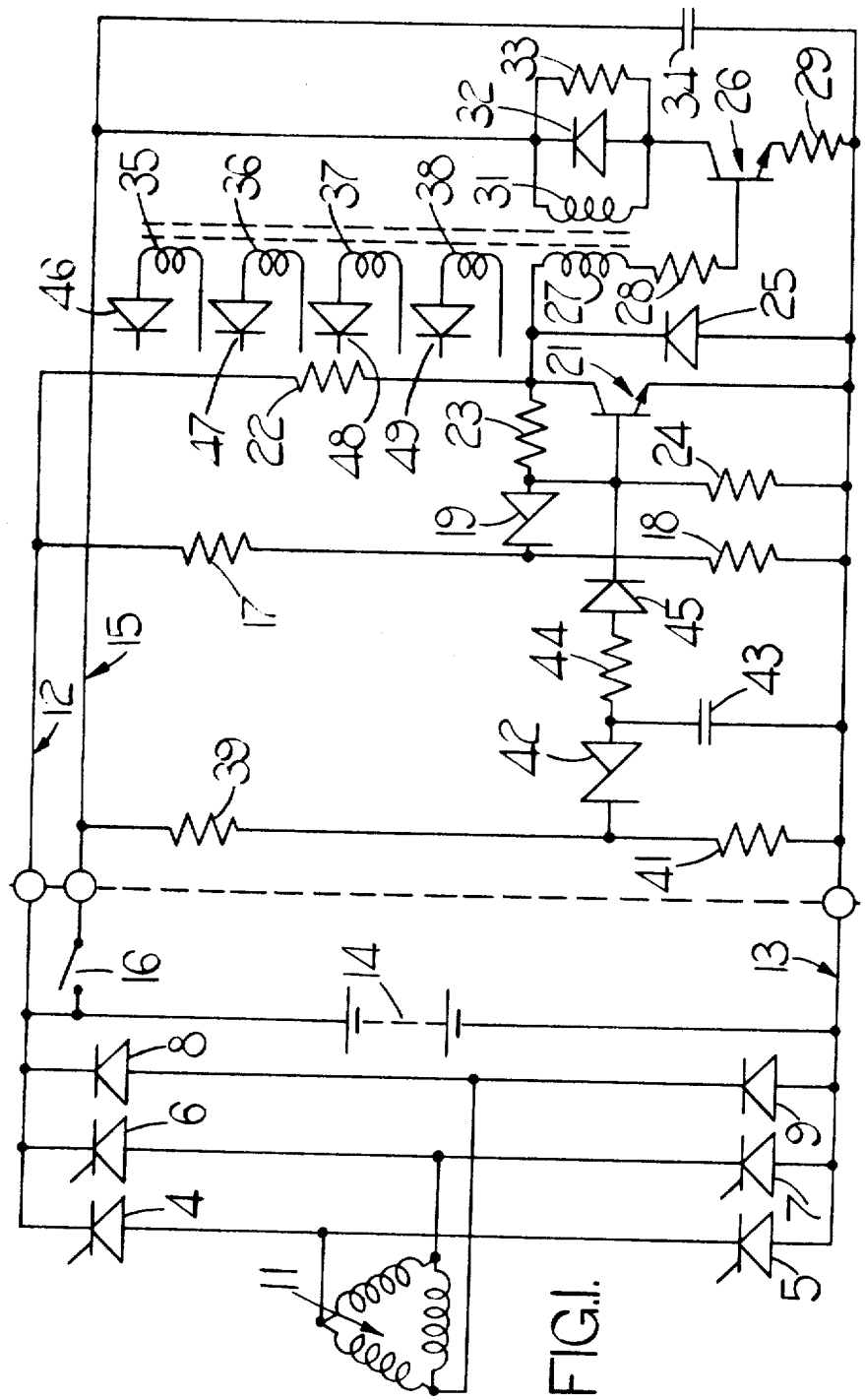
FIG. 1 is a circuit diagram illustrating one example of the invention.

Referring to FIG. 1, a three phase permanent magnet alternator 11 supplies power through a full wave rectifier, consisting of four thyristors 4, 5, 6, 7 and two diodes 8, 9 to a positive supply line 12 and a negative supply line 13, which conveniently is earthed. It will be seen that two of the phases of the alternator 11 have two thyristors 4, 5 and 6, 7 associated therewith respectively, the third phase being associated with the two diodes 8, 9. The battery 14 of the vehicle is connected between the lines 12, 13 and provides power to a further positive supply line 15 by way of the ignition switch 16 of the vehicle. The ignition-controlled loads (not shown) of the vehicle are connected between the lines 15, 13.

Connected in series between the lines 12, 13 are a pair of resistors 17, 18, the junction of which is connected through a Zener diode 19 to the base of an n-p-n transistor 21 having its emitter connected to the line 13 and its collector connected through a resistor 22 to the line 12. The collector and base of the transistor 21 are interconnected through a resistor 23, the base of the transistor 21 is connected through a resistor 24 to the line 13, and the collector of the transistor 21 is connected through a diode 25 to the line 13. The collector of the transistor 21 is connected to the base of a transistor 26 through the primary winding 27 of a transformer 30, and a resistor 28 in series with the winding 27. The emitter of the transistor 26 is connected through a resistor 29 to the line 13, and the collector of the transistor 26 is connected through a secondary winding 31 of the transformer 30 to the line 15, the winding 31 being bridged by a diode 32 and a resistor 33 in parallel. A capacitor 34 interconnects the lines 15 and 13, and the transformer includes four further secondary windings 35, 36, 37 and 38. The winding 35 has one end connected to the gate of the thyristor 4 through a diode 46 and its other end connected to the cathode of the thyristor 4. The other windings 36, 37, 38 are similarly connected to the thyristors 5, 6, 7 through diodes 47, 48, 49 respectively. Finally connected across the lines 15 and 13, are a pair of resistors 39, 41, the junction of which is connected through a Zener diode 42 and a capacitor 43 in series to the line 13. The junction of the Zener diode 42 and the capacitor 43 is connected through a resistor 44 and a diode 45 in series to the base of transistor 21.

Assuming for the moment that the output voltage of the battery 14 is below the predetermined voltage, then the Zener diodes 19 and 42 are non-conductive, and hence the transistor 26 and its associated circuit oscillate by virtue of the feedback circuit through the winding 27 and resistor 28. When the transistor 26 is conducting, then since the diode 25 is conducting, the transistor 21 is held off by virtue of the negative voltage at the junction of the resistors 22 and 23. At this stage, the transformer 30 provides gate current for each of the thyristors 4, 5, 6, 7 so that any forward biased thyristor can turn on. When the transistor 26 is in the non-conducting part of the cycle, the transistor 21 is turned on by current flowing through the resistors 23 and 24, the voltage on the winding 27 reverses, and the current decays in the winding 31, the diode 32 and the resistor 33.

Each thyristor will turn off again as soon as it is reverse biased, but as long as the oscillator is operating, pulses are supplied to the gate-cathode circuits of the thyristors at a sufficiently high frequency to keep the thyristors conductive, so that the thyristors and diodes 8, 9 together constitute a full wave rectifier. However, when the battery voltage exceeds a predetermined value, the Zener diode 19 conducts, although the Zener diode 42 does not in normal use conduct even at this stage. When the Zener diode 19 conducts, the transistor 21 becomes fully conductive, and the oscillator ceases to operate. No further gate current is now supplied to any of the thyristors, and each thyristors will turn off as soon as it is reverse biased and remain off until the battery voltage falls again, so that the Zener diode 19 stops conducting and the transistor 26 starts oscillating again.

If a battery lead becomes disconnected so as to interrupt a charging current, then the voltage between the lines 12 and 13, and the lines 15 and 13, will rise rapidly. In these circumstances, the Zener diode 19 will of course conduct again, so that the oscillator ceases to operate and no gate current is supplied to the thyristors 4, 5, 6, 7. Since four thyristors are used in the rectifier, they will inevitably turn off provided that the gate current is not supplied again before they have time to do so. It will of course be appreciated that soon after the oscillator ceases to operate the voltage between the lines 12, 13 will fall, and so the Zener diode 19 may cease to conduct before the thyristors have turned off. However, the Zener diode 42 also conducts when the battery leads become disconnected, it being appreciated that the increase in voltage on the lines 12, 13 and of course the line 15, will be far greater in these circumstances than in normal operation of the system. When the Zener diode 42 conducts, the capacitor 43 charges up, the transistor 21 turns on, and the oscillator ceases to operate. However, if the Zener diodes 19 and 42 cease to conduct because the voltage between the lines 12, 13 and the lines 15, 13 falls below the predetermined value, then the transistor 21 is still held on by the discharge of capacitor 43, thereby ensuring that the oscillator does not operate until the capacitor 43 has discharged. The circuit is designed so that this delay period is sufficient to ensure that the four thyristors will turn off, preventing indefinite repetition of the over-voltage condition.

The purpose of the resistor 29 is to limit the current through the transistor 26. The capacitor 34 provides a local return path for high frequency currents in the transistor 26.

Figure 2:
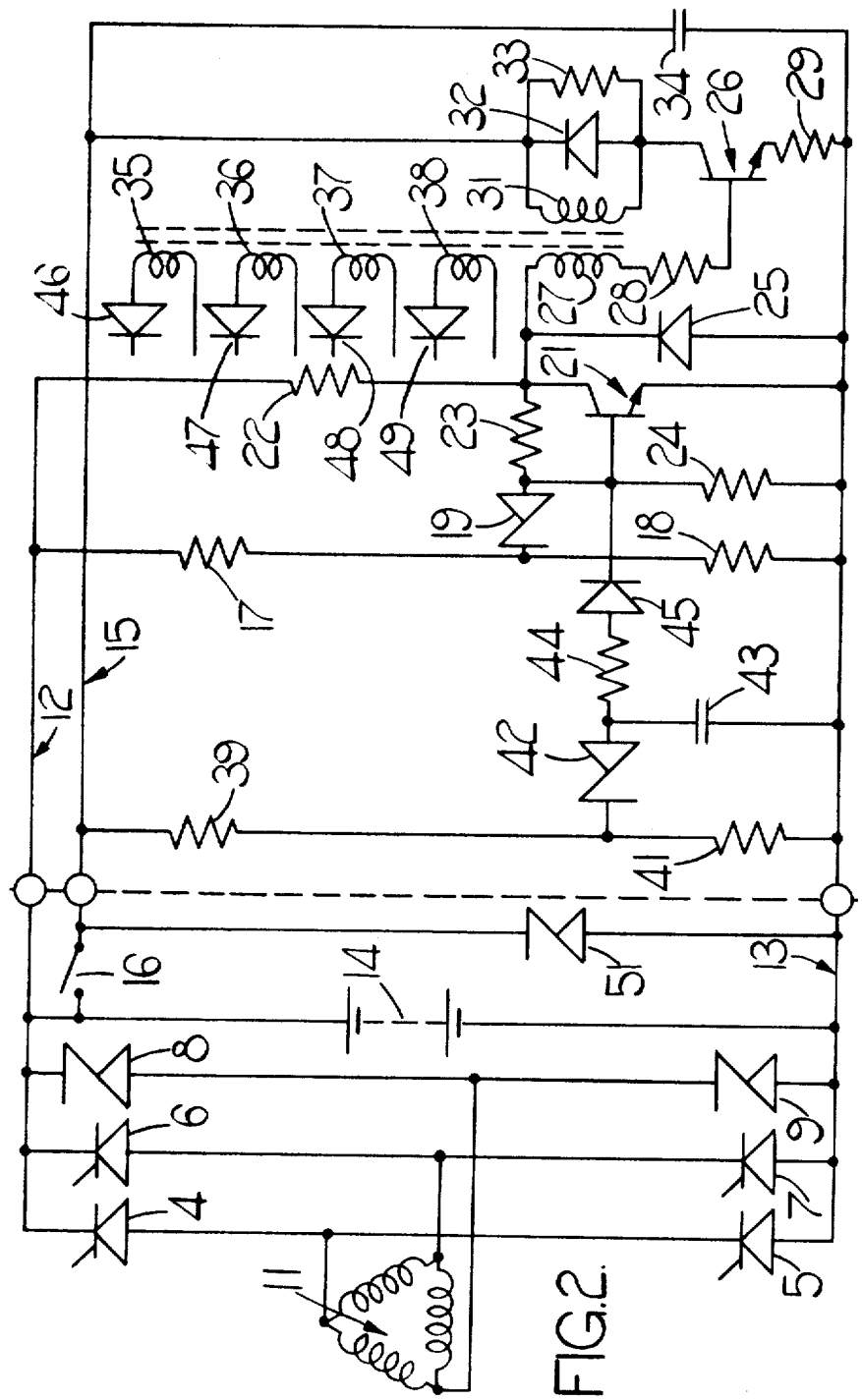
FIG. 2 is a view similar to FIG. 1 illustrating two modifications of the arrangement shown in FIG. 1.

Referring now to the example shown in FIG. 2, the operation is similar to the arrangement shown in FIG. 1, but in this example, an additional Zener diode 51 is connected across the rectified d.c. output in order to limit the amplitude of the brief surge which occurs upon disconnection of the battery. The same effect can be achieved by using as the diodes 8, 9 Zener diodes which normally operate as ordinary diodes but which also are capable of conducting as Zener diodes in order to regulate the rectified output voltage. This modification is also shown in FIG. 2, but it is to be appreciated that the use of Zener diodes 8 and 9 is an alternative to the use of the Zener diode 51, and that in order to gain the required advantage there is no need to use both alternatives.

I claim:

1. A battery charging system including a three phase permanent magnet alternator for charging the battery through a full wave rectifier, thyristors associated with the full wave rectifier for controlling the supply of power from the alternator to the battery, and a voltage sensitive control circuit controlling the gate current supplied to the thyristor to regulate the output voltage of the alternator, in which the full wave rectifier includes four thyristors and two diodes, the two diodes being associated with one phase of the alternator and the four thyristors being associated with the other two phases of the alternator, the voltage-sensitive control circuit providing gate current to the four thyristors when the rectifier output voltage is below a predetermined value, and removing the gating current when the rectifier output voltage is above the predetermined value, the system further including delay means for sensing a voltage surge caused by disconnection of the battery, and for ensuring that in these circumstances gate current is removed from the thyristors for a predetermined period of time sufficiently long to ensure that the thyristors turn off.

2. A system as claimed in claim 1 including a Zener diode connected across the output of the rectifier, said Zener diode limiting the amplitude of said surge during said predetermined period of time.

3. A system as claimed in claim 1 in which said diodes are Zener diodes, said Zener diodes limiting the amplitude of said surge during said predetermined period of time.

* * * * *